3,012,048
METHOD OF MAKING MIXED GLYCEROL ESTERS OF FATTY AND LACTIC ACIDS
Sydney H. Shapiro, Chicago, Ill., assignor to Armour and Company, Chicago, Ill., a corporation of Illinois
No Drawing. Filed July 14, 1959, Ser. No. 826,919
14 Claims. (Cl. 260—410.8)

My invention relates to the preparation of glycerol esters of mixed fatty acids and more particularly to a method for producing mixed glycerol esters of long-chain fatty acids and lactic acid.

Several processes are known for the preparation of mixed aliphatic glycerol esters of fatty and hydroxy acids, as these esters have found wide usage as shortening additives. The product of these processes, however, often contains impurities which cause a bitter taste to be imparted to the product and a haze to be imparted to shortenings containing the mixed esters. Heretofore, these impurities have been removed by washing the product with water.

I have now discovered a process for the preparation of mixed glycerol esters of fatty and hydroxy acids which does not require a water washing step, and which formulates a clear bland product. To achieve this desired result, I contact a fatty acid having from about 8 to about 22, and preferably 12 to 22, carbon atoms with glycerol and lactic acid, at a molar ratio of fatty acid to lactic acid of 1.0: no more than 0.62 in the presence of calcium hydroxide.

The fatty acids useful in my process are acids having 12 to 22 carbon atoms which are derived by the hydrolysis of the usual animal and vegetable fatty acid sources such as coconut oil, palm oil, lard, tallow, castor oil, olive oil, peanut oil, corn oil, soybean oil, lard oil, and various fish oils. Such acids include myristic, palmitic, stearic, palmitoleic, oleic, linoleic, lauric, ricinoleic, arachidic, linolenic, eleostearic and erucic acid. Of these acids, I prefer to utilize saturated fatty acids as they form products which are considered to be better emulsifiers than do the unsaturated fatty acids. Of the saturated fatty acids, I prefer to use stearic and palmitic acids or mixtures thereof.

Calcium oxide is used as a catalyst in my process. While any amount of catalyst can be utilized, it is not economical to utilize more than about 1% by weight. Generally, I use from about 0.01 to about 1% and preferably about 0.02 to about 0.06% by weight calcium oxide.

The reaction temperatures are not critical, though I prefer to utilize temperatures on the order of about 175–240° C. and temperatures of about 185–225° C. are considered to be about optimal. I have found that the haze problem arises when the ratio of lactic acid to fatty acid is greater than 0.062 to 1. Generally molar ratios of fatty acids to glycerol to lactic acid of 1.0:0.6–1.0: no more than 0.62 are operative to produce a bland haze-free product. Preferably, a molar ratio of 1.0:0.6 to 0.8:0.4 to 0.62 is utilized while a ratio of about 1.0:0.7:0.6 is considered to be optimum.

After the raw materials have been mixed, they are heated at a desired temperature for a period of time ranging from about 5 to about 8 hours to obtain a desired product. Under optimum conditions, the complete reaction requires no more than about 6 hours. After the reaction has gone to completion, the calcium ions can be removed by filtration if the free fatty acid content of the final product is sufficiently low to precipitate the calcium soaps. Alternatively, the calcium can be removed by other means, for example, by passing the product over ion exchange resins and adsorbing the calcium on the resin. As indicated above, the calcium soaps are soluble in the reaction product above certain free fatty acid concentrations and precipitate from solution about when the fatty acid content is reduced. The greatest amount of precipitate is formed when the free fatty acid content is lowest.

If it is desirable to formulate product having a free fatty acid content higher than 1%, the calcium may be removed by adsorption on ion exchange resins, acid activated clays, acid treated carbon blacks, or montmorillonites. Generally, it is desirable to formulate mixed ester emulsifying agents having a free fatty acid value no greater than 3 and I prefer to formulate products having free fatty acid values no greater than 2.

The following examples more fully illustrate my invention, but it is not intended that my invention be limited to the molar ratios, temperatures, etc., set out therein. Rather, it is intended that all equivalents obvious to those skilled in the art be included within the scope of my invention as claimed.

*Example I*

To prepare glycerol lactopalmitate, 444 grams of palmitic acid, 100 grams of 99% glycerine, 120 grams of 88% lactic acid and 0.1368 grams of calcium oxide, a reactive molar ratio of palmitic acid to glycerine to lactic acid of 1.0:0.74:0.68, are charged into a one liter round bottomed flask equipped with a thermometer, stirrer, gas ebullator, a vertical condenser and connections to a vacuum system. The initial heating was carried out in the presence of $CO_2$ for one hour. At the end of this heating period, the addition of carbon dioxide was stopped and the pressure was reduced until a pressure of 35 mm. Hg was obtained. These conditions were maintained for an additional two and one-half hours and the pressure further reduced to 20 mm. Hg and the temperature raised and held between 195–200° C. After an additional three hours, the reaction mixture was cooled 150–160° C. 6.84 grams (1%) of an acid-activated clay (Super-Filtrol) was added to the reaction mixture and stirred for one-half hour. The reaction mixture was filtered at 90° C. to yield 587 grams (94.5%) product which analyzed as follows:

Acid value _____ 3.4.
Saponification value _____ 256.
Monoglyceride, percent _____ 9.99.
Free glycerine, percent _____ 0.86.
Color, Lovibond 5¼ _____ 1.4R—6Y.
Haze, 10% in shortening _____ Positive.

*Example II*

Utilizing the apparatus of Example I, 490 grams of palmitic acid, 122 grams of 99% glycerine, 122 grams of 88% lactic acid and 0.1172 gram of calcium oxide, a reactant molar ratio of palmitic acid to glycerine to lactic acid of 1.0:0.68:0.63, were heated to 185–200° C. in an atmosphere of carbon dioxide and maintained at these conditions for one and one-half hours. The addition of carbon dioxide was stopped and the pressure gradually reduced to 25 mm. mercury. After 7 hours, the temperature was reduced to 150–160° C. and 7.32 grams (1%) of acid activated clay was added to the reaction mixture. Mixing was continued for an additional one-half hour and the product cooled to 90° C. and filtered. The product, 628.5 grams (92.4% of theory) had the following properties:

Acid value _____ 0.38.
Saponification value _____ 262.
Monoglyceride, percent _____ 7.82.
Free glycerine, percent _____ 0.66.
Color, Lovibond 5¼ _____ 0.6R—3Y.
Haze, 10% in shortening _____ Very faint.

Example III

Into a 1,000 gallon reactor equipped with stirrer, condenser, gas ebullator and a means for creating a vacuum, 2,000 kg. of palmitic acid, 508.6 kg. of 99% glycerine, 487.3 kg. of 88% lactic acid and 0.7 kg. of calcium oxide were introduced. The molar ratio of palmitic acid to glycerine to lactic acid was 1.0:0.7:0.61. The reactants were heated in an atmosphere of nitrogen to 185° C. and held for one hour. The nitrogen supply was cut off and the pressure reduced to 6 inches Hg and at the end of three quarter hours, the pressure was adjusted to fourteen inches Hg. The reactants were then, over a three hour period, heated to 195–205° C. at which time the pressure was adjusted to 27.5 inches Hg. The reactants were held at this temperature for about two hours to form a product having an acid value less than 2. The product was stripped with nitrogen for one hour and cooled to 143° C. At this time 22 kg. acid activated clay and 1.36 kg. of an anti-oxidant, were added and the product filtered. The product, 2610.5 kgs. (96.3% of theory) was found to have the following properties:

| | |
|---|---|
| Acid value | 1.56. |
| Saponification value | 254. |
| Monoglyceride, percent | 9.8. |
| Free glycerine, percent | Nil. |
| Color, Lovibond 5¼ | 3R—10Y. |
| Haze, 10% in shortening | None. |

Now having described my invention, what I claim is:

1. In a method of preparing mixed ester emulsifying agents, the step comprising contacting glycerol with a fatty acid having 8–22 carbon atoms and lactic acid at a fatty acid to lactic acid molar ratio of 1.0: no greater than 0.62 to form a haze-free product.

2. In a method of preparing mixed ester emulsifying agents, the step comprising contacting glycerol with a fatty acid having 8–22 carbon atoms and lactic acid at a fatty acid to lactic acid molar ratio of 1.0: no greater than 0.62, in the presence of calcium oxide to form a haze-free product.

3. In a method of preparing mixed ester emulsifying agents, the step comprising contacting, at temperatures of about 175–240° C., glycerol with a fatty acid having 8–22 carbon atoms and lactic acid at a fatty acid to polyhydric alcohol to lactic acid molar ratio of 1.0:0.6–1.0: no greater than 0.62 in the presence of about 0.01 to about 1.0% by weight of calcium oxide to form a haze-free product.

4. The process of claim 3 wherein, after the formation of the mixed ester, calcium ions are removed from the mixed ester.

5. The process of claim 3 wherein the temperature is from about 185 to about 225° C., the molar ratio of fatty acid to glycerol to lactic acid is 1:0.6–0.8:0.4–0.62 and about 0.02 to about 0.06% by weight calcium oxide is present in the reaction mixture.

6. The process of claim 5 wherein the reactant molar ratio is about 1.0:0.7:0.6.

7. In a method of preparing mixed ester emulsifying agents, the step comprising contacting, at temperatures of about 175–240° C., glycerol with a saturated fatty acid having 8–22 carbon atoms and lactic acid at a fatty acid to lactic acid molar ratio of 1.0: no greater than 0.62, in the presence of from about 0.1 to about 1.0% by weight calcium oxide to form a haze-free product.

8. The process of claim 7 wherein the temperature is about 185–225° C., the ratio of fatty acid to glycerol to lactic acid is 1.0:0.6–1.0: no greater than 0.62 and from about 0.02 to about 0.06% by weight calcium oxide is present.

9. The process of claim 8 wherein the ratio of fatty acid to polyhydric alcohol to lactic acid is about 1.0:0.7:0.6.

10. The process of claim 8 wherein the fatty acid is selected from the group consisting of stearic acid, palmitic acid and a mixture thereof.

11. The process of claim 8 wherein the molar ratio is 1.0:0.7:0.6.

12. The process of claim 8 wherein the calcium is removed from the mixed ester emulsifying agent.

13. The process of claim 8 wherein the free fatty acid value of the glycerol lactopalmitate is less than 3 and the calcium is removed from the glycerol lactopalmitate.

14. The process of claim 8 wherein the free fatty acid value of the glycerol lactopalmitate is less than 2.

References Cited in the file of this patent

UNITED STATES PATENTS

| | | |
|---|---|---|
| 2,634,279 | Kuhrt | Apr. 7, 1953 |
| 2,690,971 | Iveson et al. | Oct. 5, 1954 |